Patented Dec. 17, 1929

1,739,796

UNITED STATES PATENT OFFICE

PAUL MAHLER, OF NEW YORK, N. Y., ASSIGNOR TO DARCO SALES CORPORATION, OF NEW YORK, N. Y., A CORPORATION OF DELAWARE

PROCESS OF BLEACHING BEESWAX

No Drawing.  Application filed December 4, 1924. Serial No. 753,825.

This invention is an improved process for decolorizing beeswax or other analogous animal or vegetable waxes, the main object being to secure a white product at the minimum expense and with the use of simple and inexpensive materials and apparatus.

Color compounds are produced in beeswax if the latter be heated to a high temperature and the removal of these involves additional expense in the decolorizing process.

One important object of my invention is to secure a substantially complete elimination of color at as low a temperature as possible, so as to prevent the formation of other or additional coloring matter.

A further object of my invention is to provide a simple, inexpensive and effective method of separating decolorizing agents from the wax with the minimum loss of wax, and with the agent or agents in condition for possible reuse or revivification.

In carrying out my invention, I use as the decolorizing agent a mixture of animal or vegetable char and a hydrate of clay, such such as fuller's earth, or a product such as a non-colloidal bentonite, which has been treated with sulphuric acid.

It has heretofore been proposed to use fuller's earth as the decolorizing agent for beeswax, but I have discovered that by using a mixture of fuller's earth, or preferably the chemically treated bentonite, with an organic char, I can secure substantially complete decolorizing action at a very much lower temperature, and with consequent reduction in the formation of additional coloring compounds, and with the use of a smaller quantity of the decolorizing agents.

Of the organic chars I prefer to use a vegetable char because of the much higher decolorizing power per unit of weight, and of the vegetable chars I have secured the most satisfactory results with a product sold on the market under the name of "Darco" which is a vegetable activated char obtained from lignite. Of the chemically treated bentonites I have secured the most satisfactory results by the use of a product sold on the market as "Filtrol". This is a non-colloidal bentonite which has been treated with sulphuric acid, washed and dried. It contains a very slight amount of acid.

As an example I may melt the wax and add a mixture of one part "Darco" and five parts "Filtrol," but as above indicated, other analogous compounds might be used, the quantities selected being determined by their effective decolorizing powers. The proportions given, namely one part of "Darco" to five parts of "Filtrol," may be varied within wide limits depending upon the amount and kind of coloring matter in the particular wax being treated. The quantity of the mixture which is added will depend upon the character and amount of color present, and may be from 12 per cent to 35 per cent by weight of the wax treated. By the use of this mixture as the decolorizing agent, it is possible in most cases to obtain complete decolorizing action without heating the wax to a temperature above 100° C., and for a period not longer than thirty minutes.

In some waxes there is a slight amount of coloring matter which apparently is not readily adsorbed by any adsorbing agents and requires the addition of a very small percentage of a chemical oxidizing agent, such for instance as bichromate, permanganate, chlorate, perborate, or the like. The percentage of chemical oxidizing agent will ordinarily be not greater than a fraction of 1 per cent of the weight of the wax.

In carrying out the process it is preferable to melt the wax in a steam jacketed kettle, and mix the decolorizing agent with the melted wax. This can be done in the melting kettle or after the wax has been transferred to a closed kettle which is used both as the vessel where decolorizing takes place, and also as a montejus.

The wax is preferably transferred to a mixing kettle, and in doing so is passed through a mesh screen so as to remove any mechanical impurities which are likely to clog up the filter press through which the wax is later passed. In the mixing kettle which is also preferably steam jacketed, the wax with the decolorizing agent is kept at the required temperature for about thirty minutes, with constant stirring. This temperature should not run below 75° C. and not exceed 100° C. A temperature as high as 130° C. may be employed in some circumstances, but is not advisable.

The wax is then passed through a steam jacketed filter press and preferably by the use of compressed air applied directly in the mixing tank which now becomes a montejus effect. All piping leading from the kettle to the press should be well heat-insulated to prevent chilling of the wax in the conduits. The wax may be forced through the filter press with a pressure of about twenty pounds, and the air permitted to blow through the filter cake after the main filtering operation and until all of the wax which can be forced out easily has been removed, giving a dry cake.

An important step in my process involves the recovery of the considerable quantity of the decolorized wax remaining in the filter cake. It has heretofore been proposed to recover the wax from the filter cake by the use of a solvent, but my improved method is very much simpler and less expensive and requires the use of less expensive apparatus.

The filter cake while still hot is dumped into boiling water where it is stirred either by forcing air through it or by the boiling action of the water itself. Within a few minutes the wax and vegetable char or other organic decolorizing agent rise to the top, while the inorganic absorbing agent sinks to the bottom. In this way a clean-cut separation can be effected, leaving all of the wax originally contained in the cake in the very small amount of organic char which has been employed in the process. The inorganic agent will be found entirely free from wax, and can be thrown away or possibly revivified for reuse. To effect this separation it is necessary to use decolorizing agents such as described which have such different specific gravities that one sinks to the bottom of the hot water, leaving the wax either entirely free from adsorbing agent, or in contact with only a small amount of the latter. By using the two agents in the proportion of one to five, as above indicated, it will be noted that five-sixths of the decolorizing mixture is removed from the wax by this treatment in boiling water. If the chemically treated bentonite be the only decolorizing agent used, it will be noted that there will be a complete separation. The wax which rises to the top of the water, and which contains only a small proportion of the total decolorizing mixture, may be added to the next batch of crude wax to be treated, and most of it will be separated in the succeeding filtering operation.

In carrying out the process I use as large a proportion of the inorganic, and as small a proportion of the organic adsorbing agent, as will give the desired results, both because of the higher cost of the organic agent and the complete separation of the inorganic agent by the hot water treatment.

Although I have referred specifically only to beeswax as the material to be decolorized, the same process is applicable to other vegetable or animal waxes, such as spermacetti, cerasin, carnauba wax, candelilla wax, or the like, or might be used with some mineral waxes such as paraffin.

Having thus described my invention, what I claim as new and desire to secure by Letters Patent is:—

1. The process of decolorizing an organic wax, including the step of melting the wax and heating the same with an activated char and a non-colloidal bentonite acid treated to increase its decolorizing properties.

2. The process of decolorizing an organic wax, including the step of melting the wax and heating the same with a vegetable char and an acid treated bentonite.

3. The process of decolorizing an organic wax, including the step of melting the wax and heating the same at a temperature below 100° C. with a vegetable char and a bentonite acid treated to increase its decolorizing properties.

4. The process of decolorizing an organic wax, including the step of melting the wax and heating the same with an organic char and a solid inorganic color adsorbing agent in the proportions of one part of the former to five parts of the latter.

5. The process of decolorizing beeswax including the step of melting the wax, adding thereto a decolorizing agent comprising substantially one part of a vegetable char and five parts of a bentonite acid treated to increase its decolorizing properties, stirring at a temperature not above 100° C., and filtering.

6. In the process of decolorizing beeswax, which includes the steps of melting the wax, adding thereto a decolorizing agent comprising approximately one part of activated char and five parts inorganic color adsorbing agent, stirring for about thirty minutes at a temperature below 100° C., and filtering; the further step of adding the filter cake to boiling water to separate the wax and said inorganic color adsorbing agent.

7. In a process of decolorizing beeswax, which includes the steps of melting the wax, adding thereto a vegetable char and an inorganic solid color-adsorbent material having a specific gravity greater than that of water, stirring and filter pressing; the further steps of subjecting the filter cake to the action of water at a temperature above the melting point of the wax, to separate the mixture of wax and vegetable char of the filter cake from the clay-like substance by flotation.

8. The process of decolorizing an organic wax including melting the wax, and heating the same with an organic char and a solid inorganic color-adsorbing agent at a temperature not above 100° C.

9. The process of decolorizing an organic wax including melting the wax, heating the same with an organic char and a solid inorganic color-adsorbing agent at a temperature not above 100° C., said inorganic agent having a specific gravity greater than that of water, removing the major portion of the decolorized wax from said char and said agent by filtering, and separating said inorganic agent from the filter cake by the action of hot water.

10. The process of decolorizing an organic wax including melting the wax, heating the same with a solid inorganic color-adsorbing agent having a specific gravity greater than that of water, filtering to obtain a portion of the decolorized wax, and treating the filter cake with water at a temperature above the melting point of the wax to separate the remainder of the wax from said agent.

11. The process of decolorizing a wax which includes the steps of melting the wax, adding thereto an acid treated bentonite having color adsorptive properties, heating at a temperature not above 100° C., removing a portion of the decolorized wax from said bentonite by filtering, and removing said bentonite from the wax remaining in the filter cake by permitting said bentonite to settle in water heated above the melting point of the wax.

Signed at New York in the county of New York and State of New York this 2nd day of December A. D. 1924.

PAUL MAHLER.